United States Patent Office 3,305,380
Patented Feb. 21, 1967

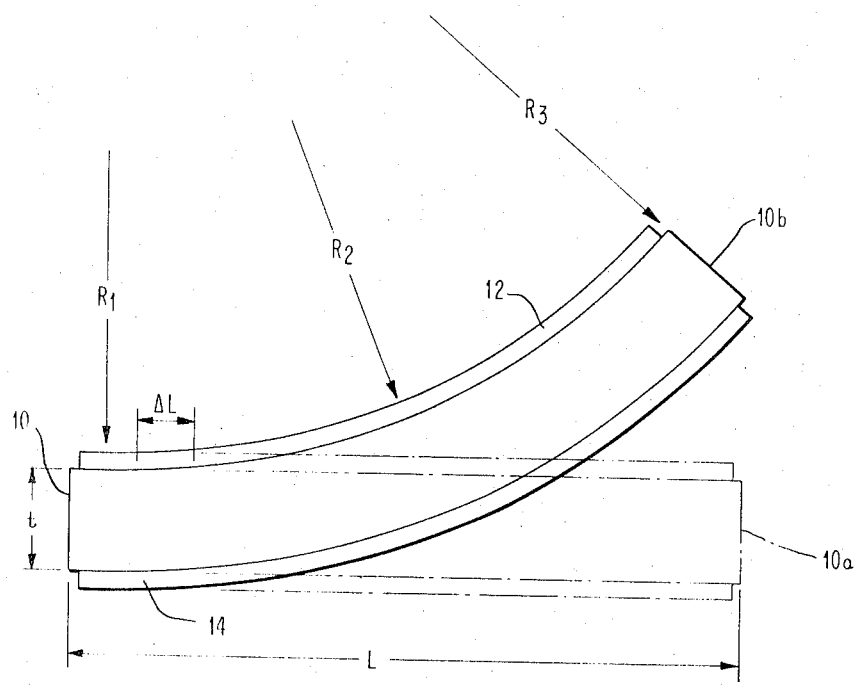

3,305,380
MAGNETIC FILM HAVING UNIFORMLY VARIABLE $H_k$ AND METHOD THEREFOR
Alfred A. Adomines, Wayne, Pa., assignor to Sperry Rand Corporation, New York, N.Y., a corporation of Delaware
Filed Apr. 8, 1963, Ser. No. 271,300
10 Claims. (Cl. 117—7)

This invention relates to a thin magnetic film. More particularly, this invention relates to a thin magnetic film which has a substantially uniformly varying $H_k$ and to a novel method for making such a film.

In the present state of the art, there have been many advances in the electronic industry. One of these advances has been in the provision of thin magnetic films. These thin magnetic films may be used for many purposes. In producing these films, great expenditures of time and capital have been made in order to provide thin magnetic films which have uniform characteristics. The uniform characteristic is a function of many variables including thickness, composition, method and rate of deposition of the film and the like. Therefore, since great pains have been taken to provide such a uniform film, it is easily seen that changes or variations in the present procedures in order to produce controlled changes or variations in the films, will be extremely burdensome.

Consequently, this invention is provided in order to present a novel device and method for making the device. The method used to provide the novel apparatus consists basically of a deformation of a substrate and the application of a thin film thereto with the resultant stress or strain on the thin film when the previously deformed substrate is returned to its original condition. By controlling the deformation of the substrate, a controlled variation in the characteristic of the film may be produced.

Thus, it is one object of this invention to provide a magnetic film which has a uniformly variable value of $H_k$.

Another object of this invention is to provide a thin magnetic film in which the drive field which is required to saturate the film in the Hard direction can be varied as a function of the position on the film.

Another object of this invention is to provide a thin magnetic film having a variable $H_k$ while maintaining a uniform thickness and width.

Another object of this invention is to provide a thin magnetic film which has a variable $H_k$ by means of a relatively simple and inexpensive process.

These and other objects and advantages of this invention will become more readily apparent when the following description is considered in conjunction with the attached drawing which shows a greatly enlarged view of a thin film on a substrate.

Referring now to the figure, there is shown a greatly enlarged schematic diagram of a thin magnetic film affixed to a substrate. Typically, the substrate base 10 may be of any of the known types of substrates as for example glass, epoxy-glass, or the like. It may be seen that the substrate 10 is shown having a curvature therein. Thus, the end 10b is displaced from the end 10a (shown dashed). In the normal unstressed configuration, the substrate base 10 will follow the configuration suggested by the dashed lines and indicated by reference numeral 10a. However, when subjected to a force, the substrate 10 is deformed to follow the solid line configuration as suggested by reference numeral 10b.

The thickness of the substrate may vary in accordance with the desired utilization thereof. Typically, however, substrates of approximately 5–20 mils may be utilized. The length, L, of the device may be of any length desired. The length of the element shown is not critical, as such, to the invention. The radius of curvature of the film, designated as R, varies along the length thereof. That is, the radius of curvature, $R_1$, at the end 10 of the substrate is greater than the radius of curvature, $R_3$, at the end 10b of the substrate. Moreover, the radius of curvature, $R_2$, between the radii at the ends of the substrate is smaller than the radius $R_1$ but greater than the radius $R_3$ It should be understood, of course, that the particular radii are determinative of the film properties as will appear infra. However, a specific limitation is not made upon the values of the several radii shown.

The thin magnetic films 12 and 14 are shown affixed to the opposite surfaces of the substrate 10. These films may have, typically, thicknesses of about 150 to 15,000 Angstroms. Both of these films need not be applied to the substrate but rather only one or the other thereof may be applied. However, for convenience, both films are shown in order to describe the invention more fully. Thus, for example, it will be seen that the radius of curvature for film 14 wil be significantly different, in both magnitude and sign, from the radius of curvature for film 12. This fact may be desirable in certain circumstances which relate to the manufacture of this film.

Although specific parameters are not designated for the film 12 or 14, it is to be understood that the films preferably exhibit uniaxial aniostropy and must have a substantially large coefficient of magnetostriction, $n$. This magnetostriction coefficient is readily determinable for different compositions of magnetic material which are used for making thin films. In a typical nickel-iron (NiFe) composition, it has been found that the coefficient of magnetostriction is relatively high (in the absolute magnitude thereof) for compositions having greater than 90% nickel (Ni) or compositions having less than 70% nickel. Although these coefficients may be opposite in sign, the relative magnitudes thereof are still large.

It can be shown that the magnetostriction coefficient, $n$, can be defined by the equation $$n = \frac{d(H_k)}{d\left(\frac{\Delta L}{L}\right)}$$

In this equation, $H_k$ is the magnetic field which is required to saturate the film in the Hard direction, $\Delta L$ is the change in length per unit length, $L$. A rudimentary integration shows that $$H_k = H_{ko} + n\frac{(\Delta L)}{L}$$

In this equation, the constant term $H_{ko}$ is the unstressed value of $H_k$.

Furthermore, it can be shown that the approximation $$\frac{\Delta L}{L} = \frac{t}{2R}$$

is a good approximation for large values of R. That is, the substrate thickness $t$ and the radius of curvature R for the substrate, when bent, are related to the relationship of $\Delta L/L$. Thus, by substituting into the equation shown supra, it may be shown that $$d(H_k) = d\left(\frac{t}{2R}\right)$$

If it is assumed that $t$ and $n$ are constant, the equation reduces to $$d(H_k) = \frac{t}{2}d\left(\frac{1}{R}\right)$$

such that a change in $H_k$ can be obtained by a change in R. The assumption is reasonable inasmuch as the substrate thickness is constant by design and the substrate is more easily produced with a relatively constant thickness $t$. The magnetostriction coefficient, $n$, may, in fact, vary somewhat throughout the thin film. This variation would be produced only by a variation in composition which may be produced by the method which is used to affix the magnetic film to the substrate. However, since the composition variation throughout a thin film is normally held within very close tolerances, for example about 1.0% or less, the value of the coefficient of magnetostriction, $n$, may be considered to be substantially constant. Thus, a change in R will produce a change in $H_k$. If the change in R is made uniform throughout the length of the substrate, either before or after the application of the thin magnetic film, the variation in $H_k$ will also vary uniformly throughout the length of the device.

Typically, the preferred method for producing this device is to provide a flat substrate as shown in the figure by reference numerals 10 and 10a. This substrate which has a uniform thickness, $t$, is bent to the form desired with a continuous variation of the radius of curvature along its length. The substrate is then held in the bent configuration by any desired means, such as a jig or the like, during the process of affixing the magnetic material thereto. The process of affixing the material may be electroplating, vacuum deposition, thermal deposition or the like and is, generally, not critical. The magnetic material which has a uniform value of $H_k$ and $n$ is affixed to the substrate 10. When the electroplating process (for example) has been completed, the substrate is removed from the shaping jig and is allowed to return to its original condition, as for example the suggested uniform flat surface. In returning to its original shape, the substrate will carry the thin magnetic film therewith. The film will then experience either a stress (as for example film 12) or a strain (as for example film 14). This stress will be a function of the variation of $\Delta L/L$. In particular, the value of $\Delta L/L$ which is exhibited by the thin film will be the negative of the value of $\Delta L/L$ which was applied while the film was being plated that is, the $\Delta L/L$ which the surface of substrate 10 experienced.

As suggested supra, the sign (or polarity) and the magnitude of the $\Delta L/L$ component depends upon the sign and magnitude of R during plating. Since R is defined as a continuously and uniformly variable parameter, the value of $\Delta L/L$ varies continuously and uniformly. Moreover, the sign and magnitude of the component $\Delta L/L$ and $n$ will produce a value of $d(H_k)$ which varies in accordance therewith. Although $n$ is defined as being constant, $\Delta L/L$ varies as described. Therefore, the value of $d(H_k)$ varies continuously and uniformly along L. Thus, it is seen that a thin magnetic film having a uniformly variable value of $H_k$ is produced.

Other methods which may suggest themselves include the method of plating a substrate which is maintained in a flat position, and subsequently bent to the desired variable radius of curvature in order to obtain the desired variable value of $H_k$. At present, it appears that this method is less practical inasmuch as the thin film devices must each have a special jig. In the event that an iterative device is produced by the method suggested, a plurality of precision jigs must be obtained. In accordance with the method first suggested, only a single jig is required in the plating apparatus.

Another method for obtaining the same result is to provide a substrate with a constant radius R over its entire length during the plating operation. A film with a variable composition and therefore a variable coefficient of magnetostriction, $n$, is affixed thereto. When the substrate is released from the curved configuration to the flat configuration, a change in the value of $H_k$ will be obtained in accordance with the change in the magnetostrictive coefficient, $n$. This method also may be less desirable than the methods noted supra inasmuch as the preparation of a composition having a controllably variable magnetistriction coefficient, $n$, is difficult.

Although the originally suggested method of preparation of a thin film device having a variable value of $H_k$ is preferred the subsequently discussed methods are also utilizable, though perhaps less desirable. Other modifications to these methods may suggest themselves, as for example the specific method of plating a film having a non-uniform thickness and the like. Moreover, the precise method utilized for depositing the film as well as insulators, binders and the like has not been described with specificity since individually desired methods may be used. However, so long as the methods and devices produced thereby fall within the scope of the description, these modifications are meant to be included within the appended claims.

The embodiments of the invention in which an exclusive property or privilege is claimed are defined as follows.

1. A method of producing a thin magnetic film having a substantially uniformly varying value of $H_k$, comprising the steps of preparing a magnetizable material suitable for plating substrates and characterized by a large coefficient of magnetostriction, deforming a flat substrate base such that a substantially uniformly varying radius of curvature is exhibited between the ends thereof, affixing a thin layer of magnetizable material to the substrate base, and returning said substrate base to said flat configuration whereby the magnetizable material affixed to the substrate base is subjected to a stress therein.

2. A method of producing a thin magnetic film having a substantially uniformly varying value of $H_k$, comprising the steps of preparing a magnetizable material suitable for plating of substrates and characterized by a large coefficient of magnetostriction, deforming a flat substrate base such that a substantially uniformly varying radius is exhibited thereby, affixing a thin film of the magnetizable material to at least one side of said substrate base, and returning said substrate base to said flat configuration whereby the magnetizable material affixed to the substrate base is subjected to a variable force thereon.

3. A method of producing a thin magnetic film having a substantially uniformly varying value of $H_k$, comprising the steps of preparing a magnetizable material suitable for plating substrates and characterized by a large coefficient of magnetostriction, affixing a thin layer of magnetizable material to a flat substrate base, and deforming the substrate base such that a substantially uniformly varying radius is exhibited between the ends thereof whereby the magnetizable material affixed to the substrate base is subjected to a stress therein.

4. The combination comprising, a substrate, a thin magnetic film, positioned on said substrate, said film having a uniformly varying value of $H_k$ along the length thereof.

5. A method for providing a thin magnetic film having a uniformly varying value of $H_k$ comprising the steps of deforming a flat substrate base member in accordance with a continuously varying radius of curvature, plating at least one surface of said substrate with a thin magnetic film exhibiting a large coefficient of magnetostriction, and restoring the plated substrate to said flat configuration such that said thin magnetic film is subjected to a uniformly varying force along the length thereof.

6. A method for providing a thin magnetic film having a uniformly varying value of $H_k$ comprising the steps of plating at least one surface of a substrate with a thin magnetic film exhibiting a large coefficient of magnetostriction, and deforming said substrate base member in accordance with a continuously varying radius of curvature such that said thin magnetic film is subjected to a uniformly varying force along the length thereof.

7. The combination comprising, a substrate, a thin magnetic film having a large coefficient of magnetostriction positioned on said substrate, said film having a uniformly varying value of $H_k$ along the length thereof.

8. The combination comprising, a substrate, a thin nickel-iron film having a relatively large coefficient of magnetostriction positioned on said substrate, said film having a uniformly varying value of $H_k$ along the length thereof.

9. The combination in accordance with claim 8 wherein said film has a thickness in the range of 150 to 15,000 Angstroms.

10. The combination in accordance with claim 9 wherein said substrate has a thickness of 5–20 mils.

References Cited by the Examiner

UNITED STATES PATENTS

| | | | |
|---|---|---|---|
| 1,774,856 | 9/1930 | Van Deventer | 117—235 X |
| 2,999,275 | 9/1961 | Blume | 18—55 |
| 3,039,891 | 6/1962 | Mitchell | 117—107 |
| 3,078,693 | 2/1963 | Lytle | 65—60 |
| 3,239,841 | 3/1966 | Henkes | 346—74 |

WILLIAM D. MARTIN, *Primary Examiner.*

W. D. HERRICK, *Assistant Examiner.*